United States Patent [19]
Graybill

[11] Patent Number: 5,179,714
[45] Date of Patent: Jan. 12, 1993

[54] PARALLEL BIT SERIAL DATA PROCESSOR

[75] Inventor: Robert B. Graybill, Ellicott City, Md.

[73] Assignee: Martin Marietta Corporation, Bethesda, Md.

[21] Appl. No.: 254,853

[22] Filed: Oct. 7, 1988

[51] Int. Cl.[5] .................... G06F 7/50; G06F 9/00; G06F 15/16

[52] U.S. Cl. .................... 395/800; 364/231.9; 364/229.2; 364/258.1; 364/DIG. 1

[58] Field of Search ... 364/200 MS File, 900 MS File; 395/800

[56] References Cited

U.S. PATENT DOCUMENTS

| | | | |
|---|---|---|---|
| 3,106,698 | 10/1963 | Unger | 364/200 |
| 4,215,401 | 7/1980 | Holsztynski et al. | 395/800 |
| 4,524,455 | 6/1985 | Holsztynski et al. | 382/41 |
| 4,533,993 | 8/1985 | McCanny et al. | 364/200 |
| 4,639,857 | 1/1987 | McCanny et al. | 364/200 |
| 4,739,474 | 4/1988 | Holsztynski | 364/200 |
| 4,835,680 | 5/1989 | Hogg et al. | 364/200 |
| 4,858,110 | 8/1989 | Miyata | 364/200 |
| 4,884,193 | 11/1989 | Lang | 364/200 |

OTHER PUBLICATIONS

John Smit, "Architecture Descriptions for the Massively Parallel Processor (MPP) and the Airborne Associative Processor (ASPRO)", Aug. 8, 1980 (Goodyear Aerospace Corporation) GER-16785.

T. J. Fountain, "An Evaluation of Some Chips for Image Processing", Univ. College London.

"Geometric Arithmetic Parallel Processor", (NCR) Model No. NCR450G72.

Primary Examiner—Thomas C. Lee
Assistant Examiner—Ayni Mohamed
Attorney, Agent, or Firm—Gay Chin; Michael L. Slonecker

[57] ABSTRACT

A single instruction multiple data systolic array processor having provision for local address generation, direct access to external devices, and programmable cell interconnectivity for providing great versatility while at the same time retaining the advantages of the SIMD architecture.

3 Claims, 12 Drawing Sheets ated by the shift register/counter, internal to the cells means and responsive to the control signals, for generating effective address data, and a memory, responsive to the shift register/counter, for storing or retrieving data at addresses indicated by said effective address data.

PARALLEL BIT SERIAL DATA PROCESSOR

BACKGROUND OF THE INVENTION

1. Field of the Invention

This invention pertains to parallel or systolic data processors comprised of individual bit serial processors. It pertains more particularly to the internal architecture of the individual bit serial processors and reconfigurable patterns of connection of the individual bit serial processors to each other as well as to external devices.

2. Background Art

The traditional way to perform repetitive logical and arithmetic operations on large quantities of data involves the use of a very fast computer operating on the data one piece at a time in series until a final result is obtained. This approach has the considerable merit that such a computer can be as versatile as its programming permits. It has the drawbacks, however, that very fast computers tend to be expensive, and even the fastest can take an appreciable amount of time to complete calculations for very large quantities of data.

If the operations to be performed are sufficiently repetitive, however, it may be possible to perform them more efficiently and quickly by dividing the data into bits of equal significance and using a large number of interconnected bit serial processors each operating on its own bit in parallel with all other bit serial processors. Machines based on this approach are known by various names, such as single instruction, multiple data or SIMD machines, parallel processors, and systolic processors. They are typically comprised of an array of identical bit serial processors or "cells", each connected to its nearest neighbors. The array may, for example, be a rectangular matrix of n columns and m rows, so that all cells except those on the edge have four physically nearest neighbors. The cells all operate under the control of a master controller to execute the same instruction concurrently on respective bits of equal significance.

A parallel processor's advantage in speed is for obvious reasons directly proportional to the number of cells comprising the array. The greatest advantage thus theoretically results from having a very large number of cells. This is almost always impracticable, however, because cost is also directly proportional to the number of cells. Nevertheless, arrays of scores and even hundreds of cells have been proposed and constructed. There is therefore an incentive to limit the cost per cell, and a similar incentive to limit the area each cell occupies on a semiconductor chip. These goals have been met in the past by keeping cell architecture as rudimentary as possible, implementing only basic functions and perhaps such additional functions as would prove especially useful in a given application. As a consequence, architectures of cells and arrays have been either dedicated to a particular application and unsuitable for any other, or so general purpose as to be inherently inefficient. Expansion and efficiency have been limited by the cell's computational power, bandwidth, memory, and set patterns of interconnection.

SUMMARY OF THE INVENTION

There thus exists a need for enhancements of cell and array architecture which increase cell computational power and versatility without unduly increasing cell complexity and size. There is also a need to retain the advantages including simplicity of SIMD architecture while at the same time increasing the parallel processor's efficiency and adaptability. This need is met in the present invention through the provision of one or more features including the capability for intracellular address generation, an I/O port which is a direct extension of the cell's arithmetic, logical, and memory resources, and programmable cell interconnectivity.

More particularly, the present invention in one aspect includes a master controller for generating control signals and address data, and a plurality of substantially identical processing cells means for processing single bits of data, each of the cells being connected to at least two other cells, and each of the cells including a shift register/counter, internal to the cells means and responsive to the control signals, for generating effective address data, and a memory, responsive to the shift register/counter, for storing or retrieving data at addresses indicated by said effective address data.

In another aspect, the present invention includes a master controller for generating control signals and address signals, and a plurality of substantially identical processing cells means, each of the cells being connected to the master controller, and each including an external I/O port and an internal one-bit register connected to the port.

In a further aspect, the cells are arranged in a rectangular array, and various multiplexer networks are intermeshed with the array to provide row or column broadcast capability, or direct input capability, for simplifying and reducing the number of clock cycles necessary to effect certain operations.

BRIEF DESCRIPTION OF THE DRAWINGS

These and other features and advantages of the invention will become apparent from the following written description read in conjunction with the drawings, in which.

DETAILED DESCRIPTION OF THE PREFERRED EMBODIMENTS

The invention will now be described in connection with several preferred embodiments. The invention should not, however, be considered as limited to these embodiments.

General principles of operation of a rectangular array of identical cells are set forth in U.S. Pat. No. 4,739,474 to Holsztynski et al, the specification of which is hereby incorporated by reference.

Figure 1:
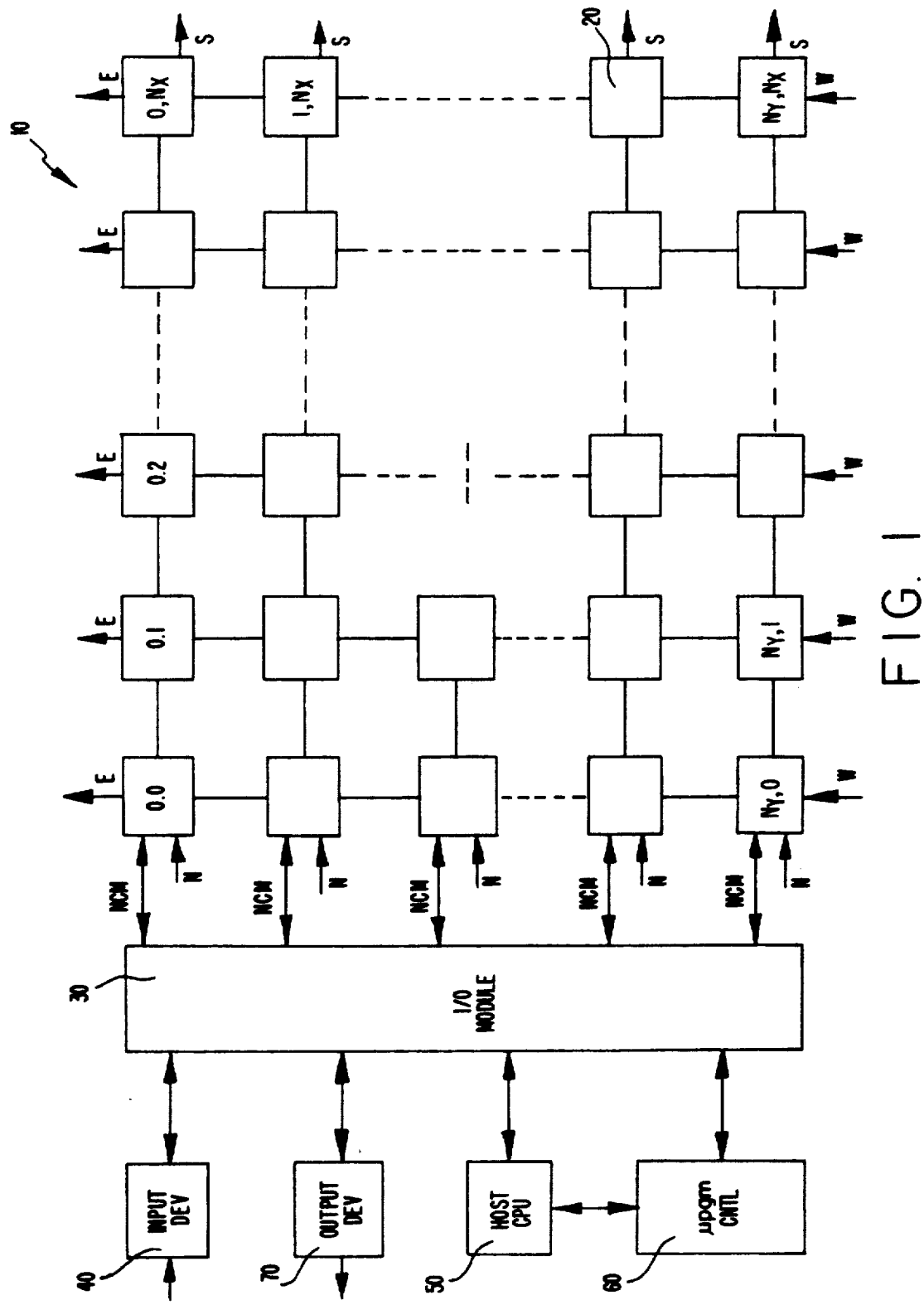
FIG. 1 is a block diagram of a preferred embodiment of a parallel bit serial data processor according to the present invention.

FIG. 1 shows an array 10 comprised of x columns and y rows of cells 20. Each cell 20 is uniquely identified by a pair of coordinates specifying its row and column in the array 10. Also, each direction is specified by a compass point, with N, S, E, and W corresponding to left, right, up, and down in the FIG. 1. These compass points will be used to maintain consistency in orientation.

The arrangement of FIG. 1 also includes an I/O unit 30. This I/O unit 30 accepts data from an input device 40 or a host computer 50 and transposes it into bit serial format for loading into the array 10 under the control of the a master controller 60. The I/O unit 30 may be any suitable electronic device for interfacing the array 10 with other equipment. For example, this unit may include controllable input and output buffers for temporarily storing data before and after processing in the array 10. The I/O unit 30 also extracts data from the array 10 and reconstitutes it as necessary for use by an output device 70 or host computer 50.

A master controller 60 is also connected by connections omitted for clarity to each cell 20 of the array 10 to provide control and address signals.

The I/O unit 30 communicates with the array 10 through a set of edge cells. In the embodiment of FIG. 1, the north edge cells (0,0 - $N_y$,0) are used. The data is then shifted into adjoining cells, an operation which is repeated under the control of master controller 60 until each cell 20 contains a bit of equal significance, at which time the cells all operate on their respective bits. Data is then shifted back out to I/O unit 30 either through the N I/O ports, the S I/O ports, or some other suitable port as explained below.

The W I/O port is also connected to a source of bit serial data such as an I/O unit or another section of array.

FIG. 1 also shows a bidirectional NCM (North Communications) port. This port is bidirectional and differs from the N port also in that it operates independently of the cells arithmetic and logical functions, as described more fully below.

Figure 2:
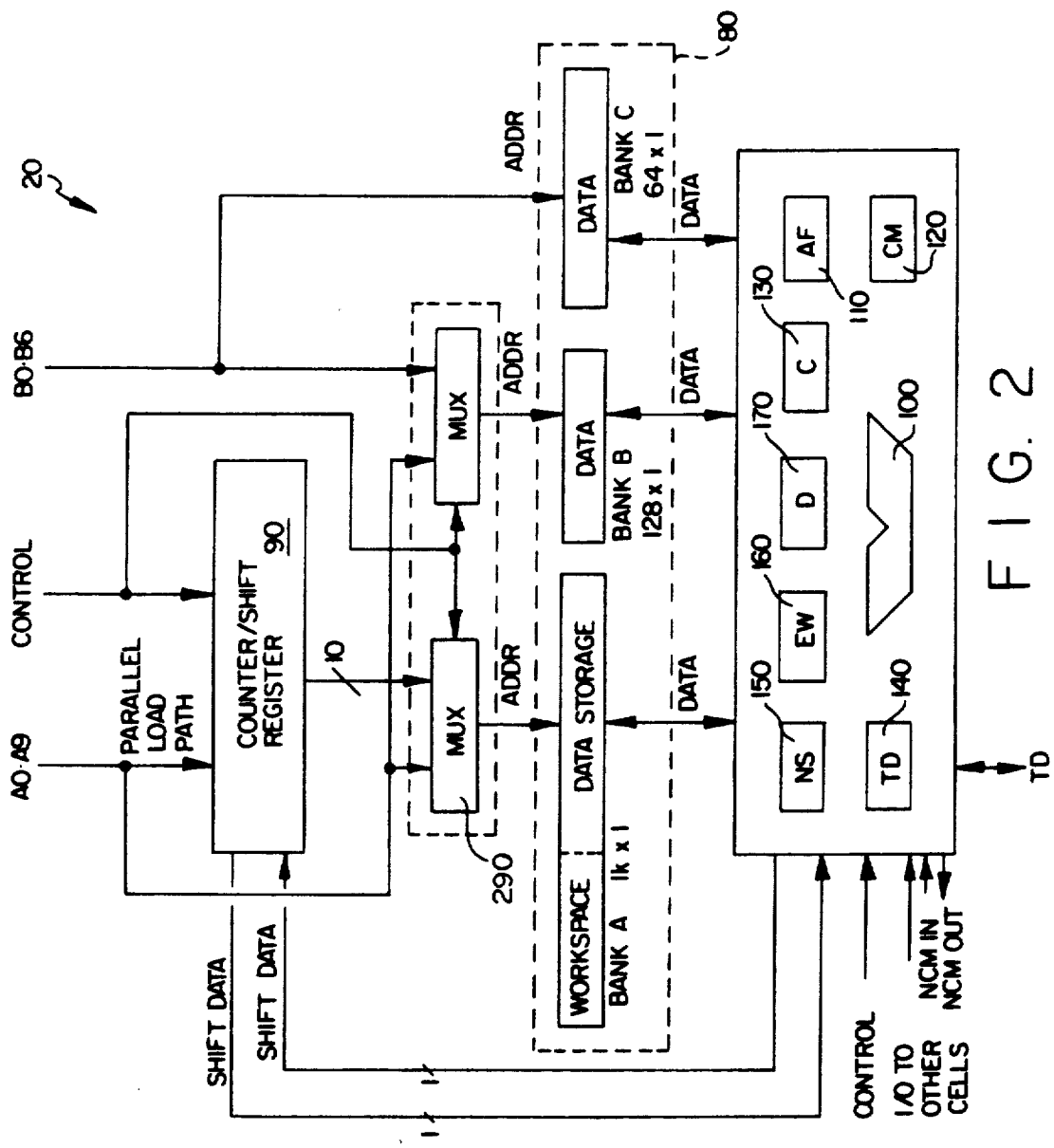
FIG. 2 is a block diagram of a preferred embodiment of a cell for a parallel bit serial data processor according to the present invention.

FIG. 2 is a block diagram of preferred internal architecture of a cell 20 according to the invention. As can be seen therein, the cell 20 includes a memory 80 which in the preferred embodiment is a static random access memory or RAM. There are preferably three segments to the memory, one which is 1024×1, another which is 128×1, and a third which is 64×1, which combine for a total of 1216×1 bits of memory. It will be understood by one of ordinary skill in the art, however, that a unitary memory could be used. The cell 20 also contains 17, registers, 10 of which are used in a shift register/counter (SR/C) 90, and the others of which will be described below. The registers are positive edge triggered devices all continuously clocked from a common source. Each register can hold its state indefinitely as required by the master controller 60. Data transfer between registers is effected in one clock cycle. The cell 20 also contains various multiplexers and a single bit ALU or adder 100, all of which will be described below.

As mentioned above, memory 100 preferably has 1216 bits of static memory. These are divided into three blocks designated Bank A or RAM0 (1024 bits×1 bit), Bank B or RAM1 (128×1), and Bank C or RAM2 (64×1). The three segments have a common data input port. The first and largest segment RAM0 can be addressed globally (extracellular) via address lines A0–A9 (AADR(00:09)) or locally (intracellular) via parallel output from the SR/C 90. RAM1 can be addressed via address lines A0–A6 (AADR(00:06)) or B0–B6 (BADR(00:06)). A global multiplexer generates the address for RAM1. RAM2 has only one address source, global address B6 (BADR(00:06)). A global address is common to all cells in the array.

Figure 3:
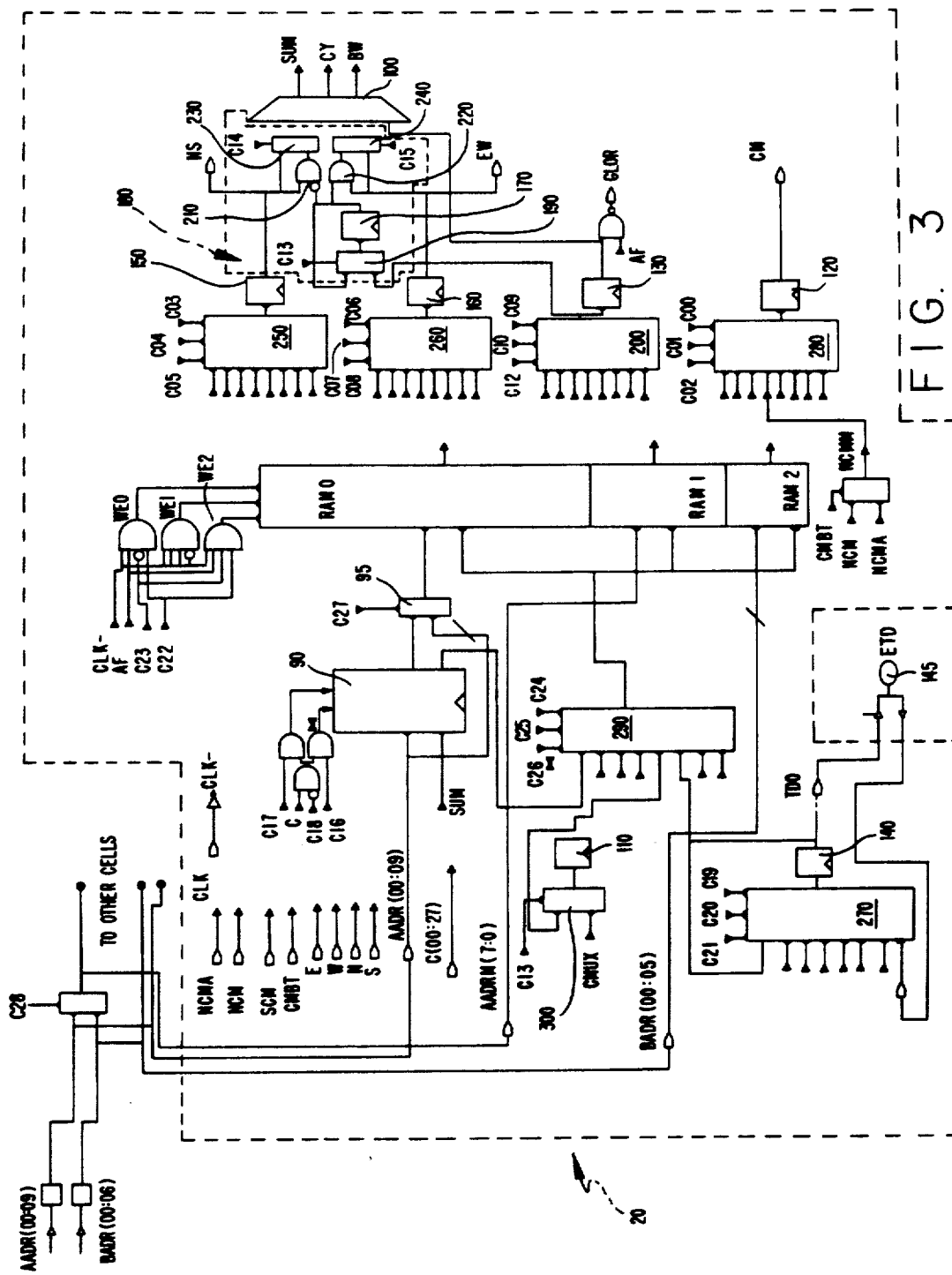
FIG. 3 is a functional block diagram of another preferred embodiment of a cell for a parallel bit serial data processor according to the invention.

Only one segment may be written into in any given clock cycle. Which RAM segment is written into depends on control lines C22 and C23, as shown in FIG. 3. It also depends on an AF value stored in an "Activity Flag" or "AF" register, as described below. Briefly, if the AF value is zero, indicating a deactivated cell, writes to the memory 80 are disabled.

The memory 80 may receive data from the serial output of SR/C 90, the sum, carry, or borrow output of ALU 100, or from the AF register 110, a Communication (CM) register 120, a Carry (C) register 130, or a Third Dimension (TD) register 140. These last three registers will be described in more detail below.

The segmented nature of the preferred embodiment of the memory 80 permits simultaneous read/write operations. Although only one segment can be written into in any given clock cycle, data can be read from the other two segments which are not written into. If no segment is being written into, then all three segments can be read. Data from all three segments can be loaded directly into the TD register 140 and the CM register 120, as well as into an NS register 150 and an EW register 160. The C register 130 and a D register 170 can obtain data only from RAM0.

It has been mentioned above that the cell 20 also preferably contains a 10-bit shift register/counter SR/C 90. This element is a means for generating effective address signals locally. The 10 bit parallel output of the SR/C 90 is connected to the address input of RAM0 through an address multiplexer 95 to provide the cell 20 with local addressing capability for RAM0. The SR/C 90 also provides a serial shift register input to any of the three segments of the memory 80 through multiplexer 290.

The serial output port of the SR/C 90 is the most significant bit of the register. This output can be written into any of the three segments of the memory 80.

The SR/C 90 can be loaded through a serial input port or a parallel input port provided thereon. The parallel input port is connected to the AADR address bus. The serial input port is connected to the sum output of the ALU 100. The sum output can be used to load the SR/C 90 from the memory 80. In other words, data can pass from the memory 80, along an appropriate path through the network of multiplexers, registers, and gates to the ALU 100 then pass through the ALU 100 unchanged to be loaded into the SR/C 90 through its serial input.

Figure 4:
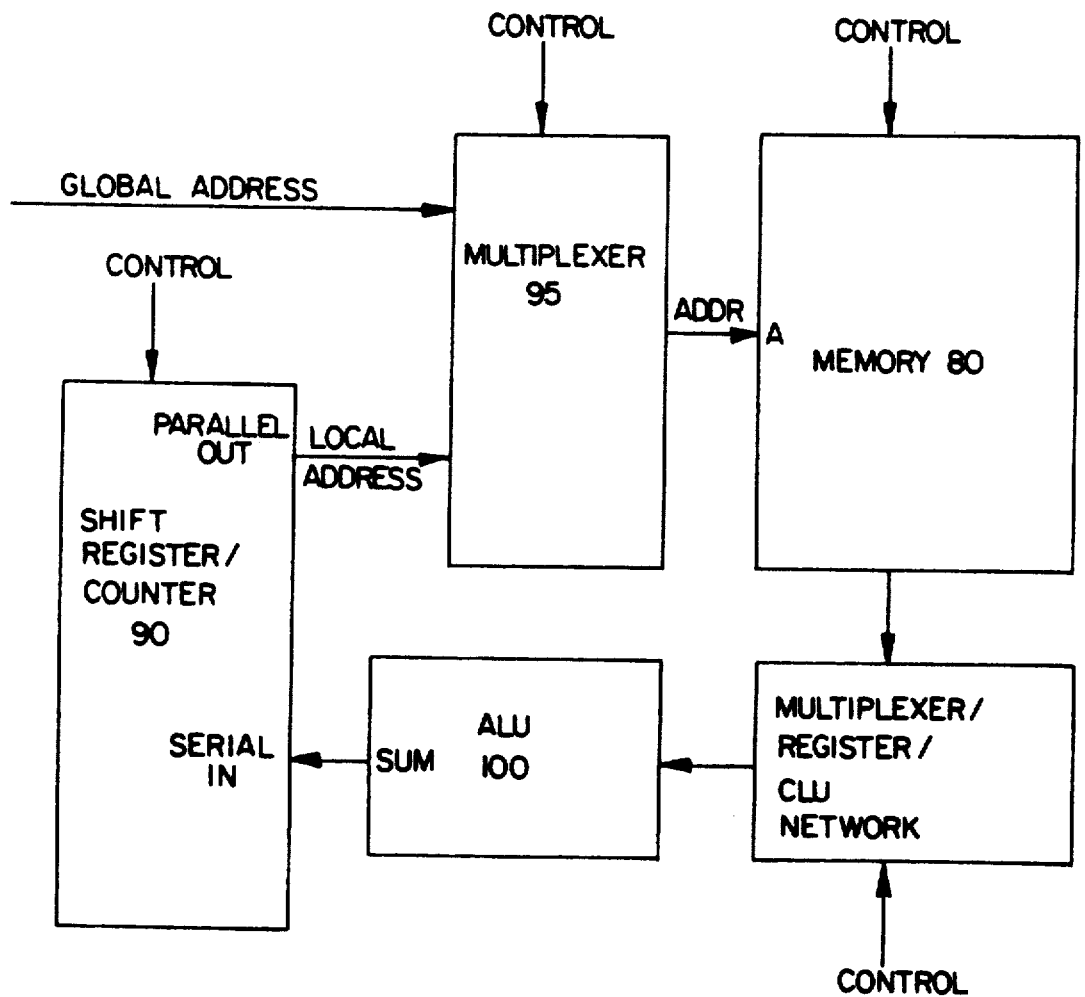
FIG. 4 is a diagram illustrating an operation of the local address generation function of the cell of FIG. 4.

It is also possible, however, to have the ALU 110 perform an arithmetic or logical operation on the address data. Such an operation is illustrated in FIG. 4. Initially, adders data may be loaded into memory 80 externally through the address multiplexer 95. This address data and data representing an offset value may then be passed along to the ALU 110 which adds them and passes the resultant effective address to the SR/C 90. SR/C 90 may then be incremented, under either global or local control, in order to access multiple bit words through the address multiplexer 95. Each is bit stored sequentially in the memory 80.

In a more advanced utilization, the offset value or effective address may be calculated from the data set. This may provide useful, as described below, in the implementation of floating point arithmetic. This powerful but logically simple innovation thus allows independent addressing of the memory 80 for each cell, within an SIMD environment as a function of predefined address offsets or as data dependent address offsets.

Figure 5A:
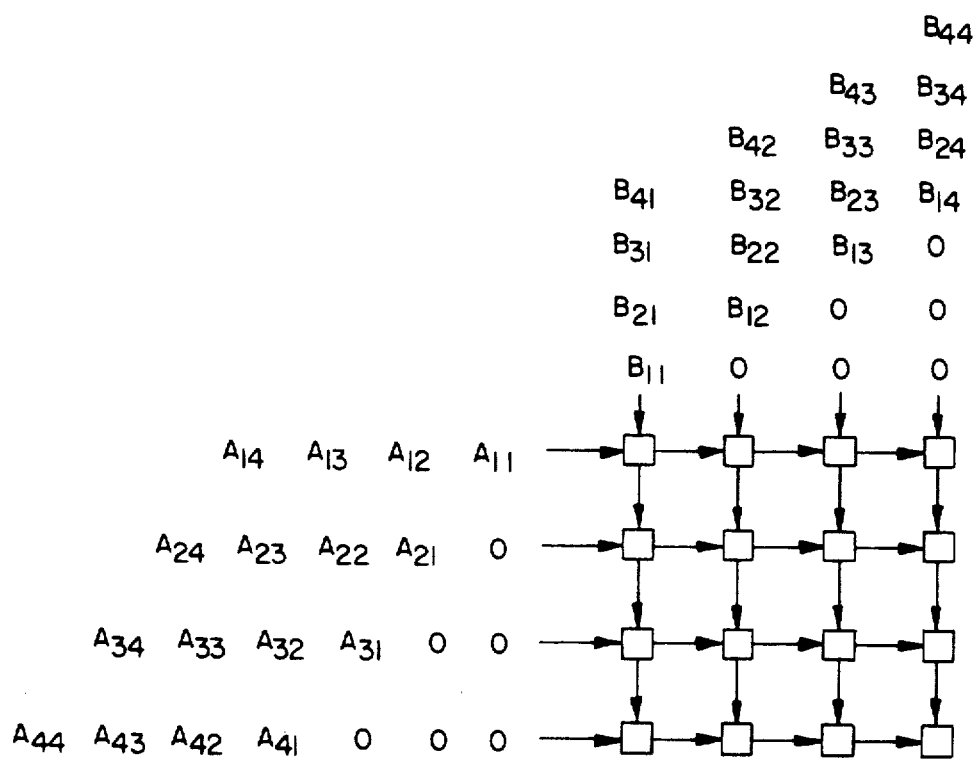
FIGS. 5(a) and 5(b) are diagrams comparing a skewed matrix operation without and with local address generation.
Figure 5B:
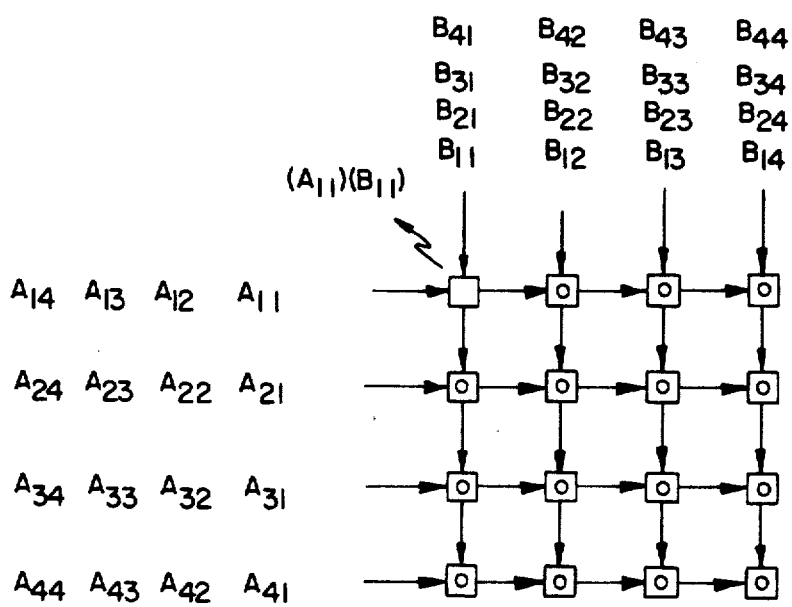

As an example of the usefulness of the local address generation capability created by the incorporation of SR/C 90, consider the problem of matrix arithmetic performed using a systolic array or parallel array simple processors. There are many known algorithms for matrix calculations using systolic arrays. An area that is neglected is the formatting of data for introduction into the array, that is, the hardware cost. A fairly standard example is illustrated in FIG. 5(a). The data is skewed in time both going into the array and coming out of the array. Individual internal memory addressing makes it possible, however, for the data to be easily loaded in block form and then skewed in time within the array for processing in a typical systolic fashion. This is illustrated in FIG. 5(b). Using this approach, standard interface logic may be used.

The local addressing capability also makes it possible to implement true floating point arithmetic. An obstacle to the implementation of floating point arithmetic on prior art SIMD parallel machine is that the single instruction architecture is not amenable to operands to be individually normalized prior to computation. The local address generation capability enables the exponent of a floating point number to be used as an index for a scratch memory location, thereby normalizing the operands prior to computation.

The cell 20, as mentioned above, also includes an ALU 100. In a preferred embodiment, the ALU 100 is a single-bit full adder, subtractor with conditional control of the input operands. The details of this conditional logic are shown in FIG. 3. Therein, it can be seen that a conditional logic unit or CLU 180 includes an input multiplexer 190 with an input connected to the output of a C multiplexer 200 and to the output of the D register 170. The input multiplexer 190 is controlled by an appropriate control signal. Its output is connected to the input of the D register 170. The output of the D register 170 is connected to a first logic gate 210 and a second logic gate 220. In the embodiment of FIG. 3, these are both AND gates. One input of the first logic gate 210 is connected to the NS register 150; the other is connected to the D register 170 and, the embodiment of FIG. 3, is an inverting input. One input of the second logic gate 220 is also connected to the input of the D register 170. The other is connected to the EW register 160.

The CLU 180 also includes a first output multiplexer 230 and a second output multiplexer 240. The inputs for the first output multiplexer 230 are the outputs of the NS register 150 and the first logic gate 210. The inputs for the second output multiplexer 240 are the outputs of the EW register 160 and the second logic gate 220.

The CLU 180 allows for conditional arithmetic operation and conditional selection operation on the NS value of the NS register 150 and the EW value of the EW register 160 based on the D value of the D register 170. This leads to great simplification of operations such as multiplication. For example, without conditional logic, the algorithm for multiplication of two multi-bit numbers involve a reiterative process of "anding" the first bit of the multiplier with the multiplicand to form a first partial sum, and then "anding" the second bit of the multiplier with the multiplicand and adding the result to the first partial sum to form a second partial sum, continuing for each successive bit until the product is formed. The CLU 180 eliminates the requirement for "anding" by providing a conditional summation capability. This allows the partial sum to be conditionally added to the multiplicand based on the present multiplier-bit value.

The sum, carry, and borrow output from the CLU 180 can be written into any one of the three segments of the memory 80 within one clock cycle. The sum output can also be loaded into the TD register 140, or the carry and borrow outputs can be loaded into the C register 130.

The TD register 140 allows each cell 20 to communicate with an external device bidirectionally. The TD register 140 can be loaded from any one of the three segments of memory 80, the sum output from the ALU 100, the C register 130, the CM register 120, and from an external bidirectional port 145. The contents of the TD register 140 can also be held. The contents of the TD register can be written into memory, loaded into the EW register 160, loaded into the NS register 150, or transferred to the external bidirectional I/O port 145. These data transfers from the TD register can occur in parallel. Communication with an external device and intercell communication (e.g., via the CM register 120) can occur simultaneously.

Figure 6:
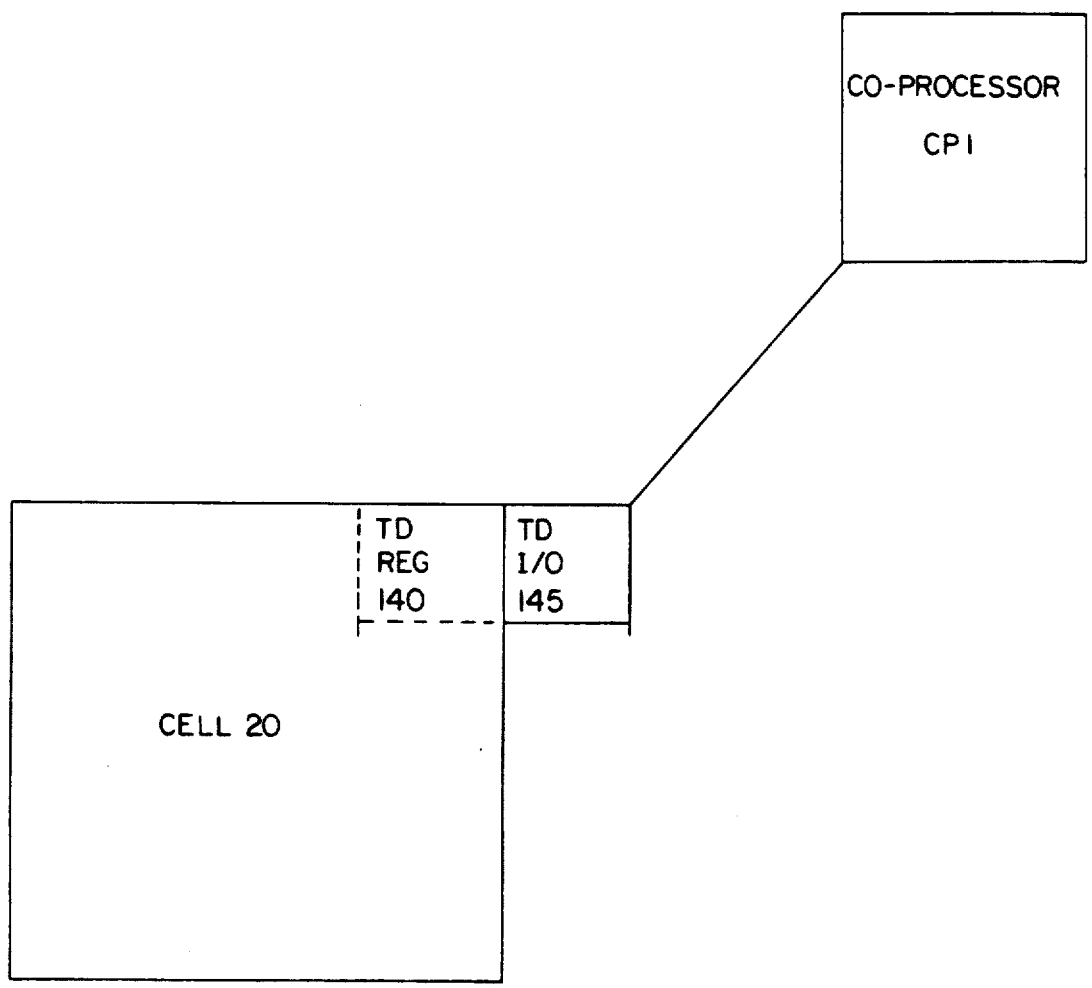
FIG. 6 is a functional block diagram of interconnection of a cell with a co-processor according to another preferred embodiment of the present invention.

One especially useful function of the communication line established through the TD register 140 is the capability of using a co-processor. An example of this is shown in FIG. 6, in which the bidirectional I/O port 145 of a cell 20 is connected to a co-processor CP1. This co-processor CP1 can be an accelerator of some type used for certain operations or a programmable interconnect network to facilitate data transfers which would enhance the performance of specific algorithms.

Figure 7:
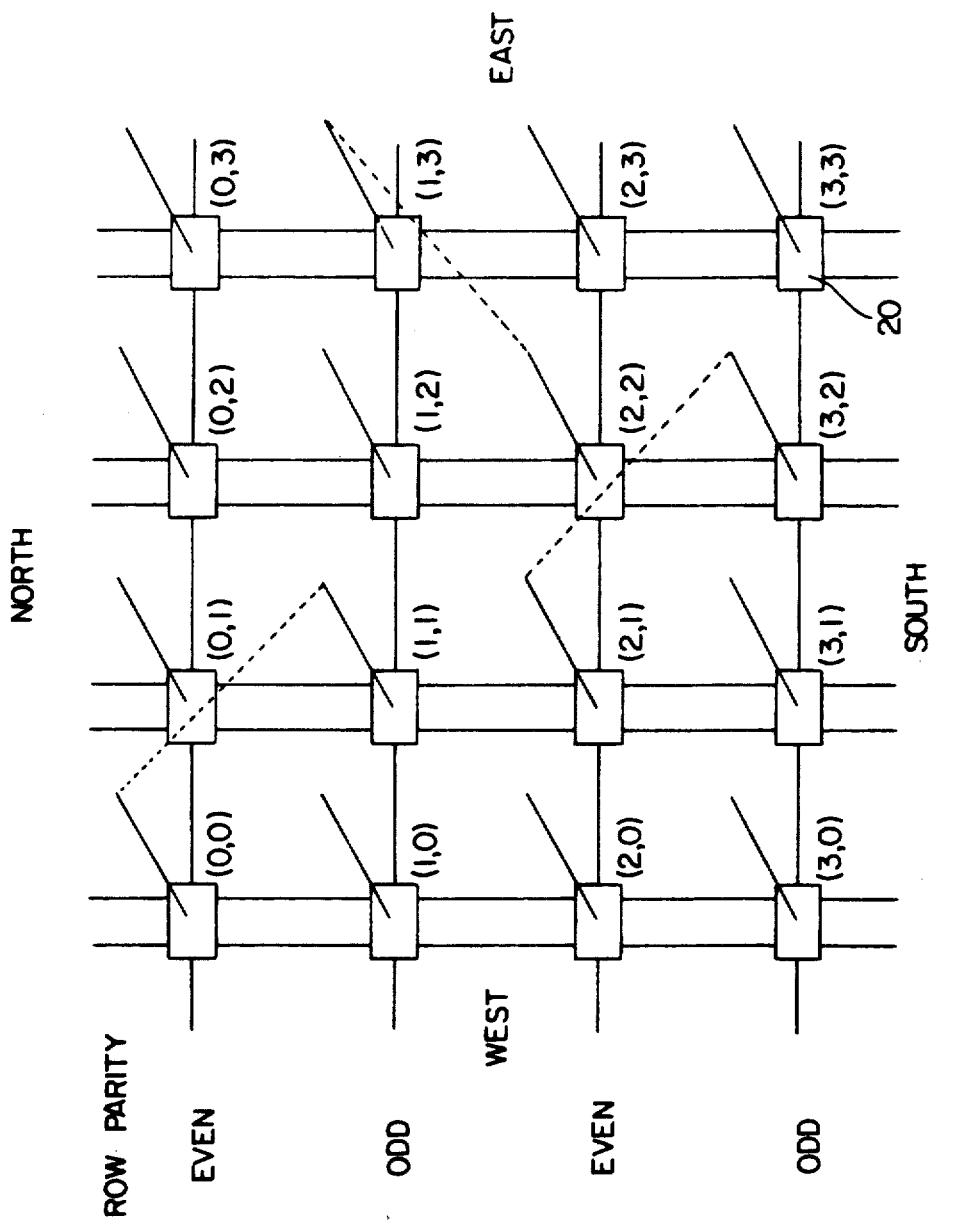
FIG. 7 is a schematic diagram showing a pattern of cell interconnection using cells according to a preferred embodiment of the present invention.

The TD registers 140 of cells 20 can also be connected directly. In one arrangement, the cells 20 are partitioned into even rows and odd rows. FIG. 7 gives an example of a 4×4 array in which rows have been assigned "parity". The third dimension register 140 can thus be configured to such a way as to allow communication between cells which are not nearest neighbors. This is accomplished by modifying the control signals affecting the TD registers 140 and physically connecting TD I/O ports 145 together.

There are many possible examples showing the usefulness of the TD register 140. As an example, external data may be loaded simultaneously with a floating point computation. The floating point computation can be divided up such that the exponent calculation would reside in the ALU 100 and mantissa calculation in a high speed dedicated bit serial multiplier co-processor, linked by the TD path. A ten-fold improvement in floating point multiply times can thus be achieved by adding only twenty-five percent more hardware in the form of co-processor multiply chips. The technique may be extended beyond floating point multiplication to any of more complex time consuming arithmetic operations such as square root and divide. This technique may be extended even further to the point of having multiple different computational memory resources sharing the same TD port. Basic algorithms such as singular value decomposition (SVD) could be implemented more easily using the third dimension connections for additional external cell storage of word planes. Fast Fourier transform (FFT) signal processing could also be enhanced. A conventional two-dimensional nearest neighbor connected array is ideal for discrete Fourier transforms but not for FFT. Due to the symmetry of FFT, the complex conjugate computation is really only a sign change and is folded back. Thus, only four horizontal rows of cells are required. The interstage shuffling of data is passed horizontally by nearest neighbor connections and diagonally by TD ports 145. These diagonal paths would be programmed external to the array 10.

The NS register 150 is available both from within the cell and external to the cell. The external cell output is provided to source data to the north or south of any given cell. The NS register 150 can be loaded from one of eight sources, one of which is a hold state. The other sources are the three segments of the memory 80, the EW register 160 the TD register 140, or from the N or S input ports as mentioned. The NS value retained in the NS register 150 is one of three operands for the ALU 100.

The EW register 160 is also available both within the cell 20 and external to the cell 20. The external cell output is provided as source data to the east or west of any given cell. This EW register 160 can also be loaded from any one of eight sources, one of which is a hold state. Again, these are the three segments of the memory 80, the NS register 150, the TD register 140, or the E or W input ports. The EW value retained in the EW register 160 is one of three operands for the ALU 100. If the operation of the ALU 100 is subtraction, then the EW register 160 retains the subtrahend operand.

The C register 130 is loaded via the C multiplexer 200 which is an 8:1 multiplexer. The C register 130 can be loaded from any one of eight sources, one of which is a hold state. The sources are the first segment of the memory 80, i.e., RAM0, the NS register 150, the EW register 160, the carry output of the ALU 100, the borrow output of the ALU 100, or a logical 0 or 1. The outputs of the C register 130 is not available external to the cell 20. The C value in the C register 130 is logically anded with the value of the AF register 110 to form the GLOR output signal of the cell 20. The cell is considered active if both the C value and the AF value are a logical 1. The C value is a direct input for the ALU 100's carry input signal and is one of the three operands for the ALU 100. The CM register 120 allows bidirectional communication along the north-south access without affecting the operations of the ALU 100. CM register 120's output is available both within the cell 20 and external to the cell 20. The CM register 120 can be loaded from any one of eight sources, one of which is a hold state. The other sources are any one of the three segments of the memory 80, the N and S communication ports, or a logical 0 or 1.

There may also be provision for global input to each cell in the given column. This is accomplished to the north CM global input as explained below.

As mentioned above, cell 20 is also provided with various multiplexers for controlling the source of data for the various registers and segments of memory 80. The C multiplexer 200 has already been mentioned. The cell 20 also includes 8:1 data multiplexers for the NS register 150, the Ew register 160, the TD register 140, and the CM register 120. Respectively, these are the NS multiplexer, the EW multiplexer 260, the TD multiplexer 270, and the CM multiplexer 280. There is also an 8:1 multiplexer DIMUX 290 and an address multiplexer 95 associated with the memory 80.

The AF register 110 is loaded via the output of the C multiplexer 200 via an associated AF multiplexer 300 line select is controlled by an appropriate control signal. Writes to all three banks of the memory 80 are disabled if the AF value in the AF register 110 is 0. Also, the AF value is anded with the C value in the C register 130 to obtain the global output GLOR signal. This global output signal is used for global branch operations in the array. The output for the array is forced to a predetermined state if any one of the cells 20 in the array is active.

Figure 8:
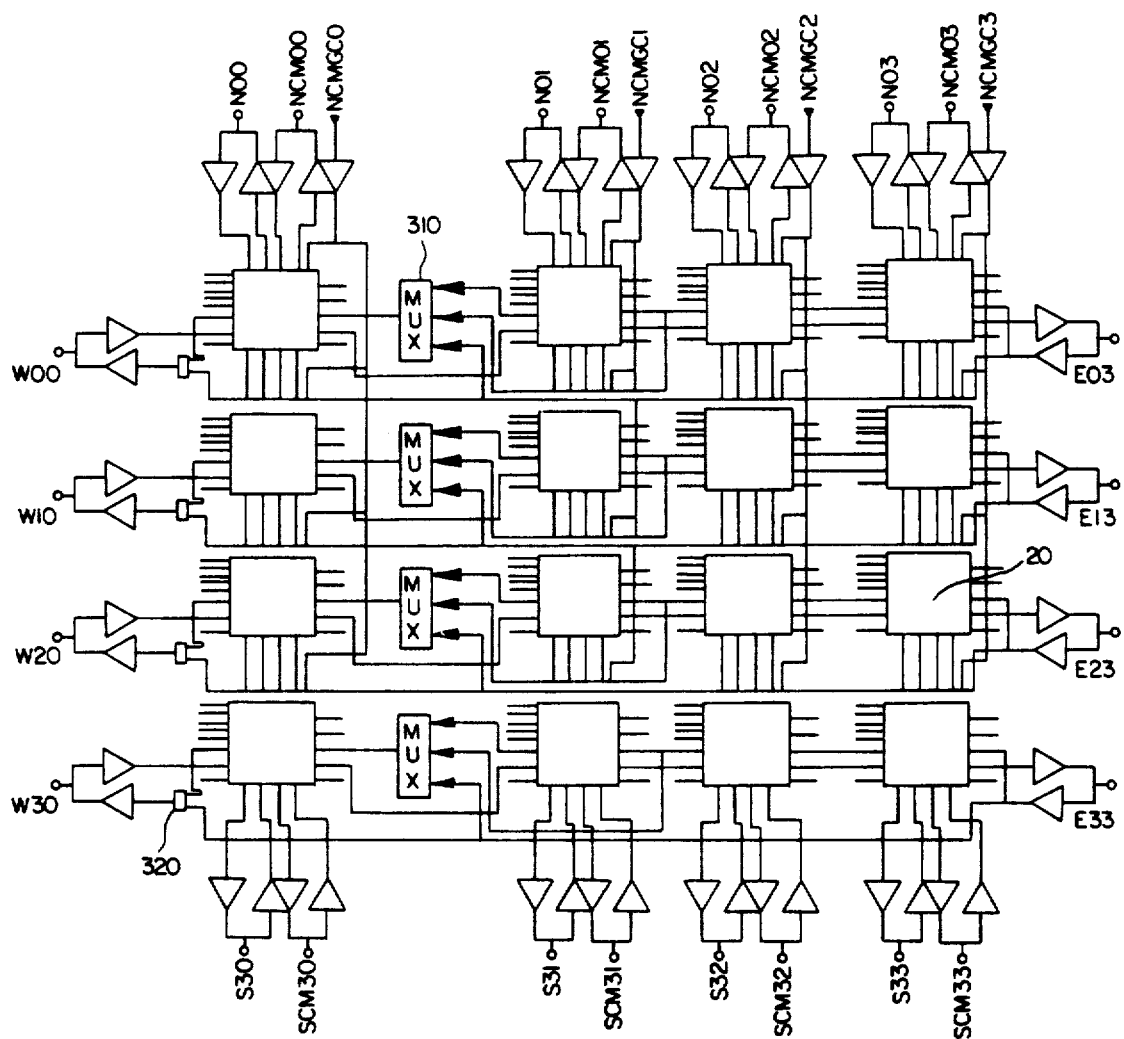
FIG. 8 is a functional block diagram of a 4×4 array of the cells of FIG. 2.
Figure 9:
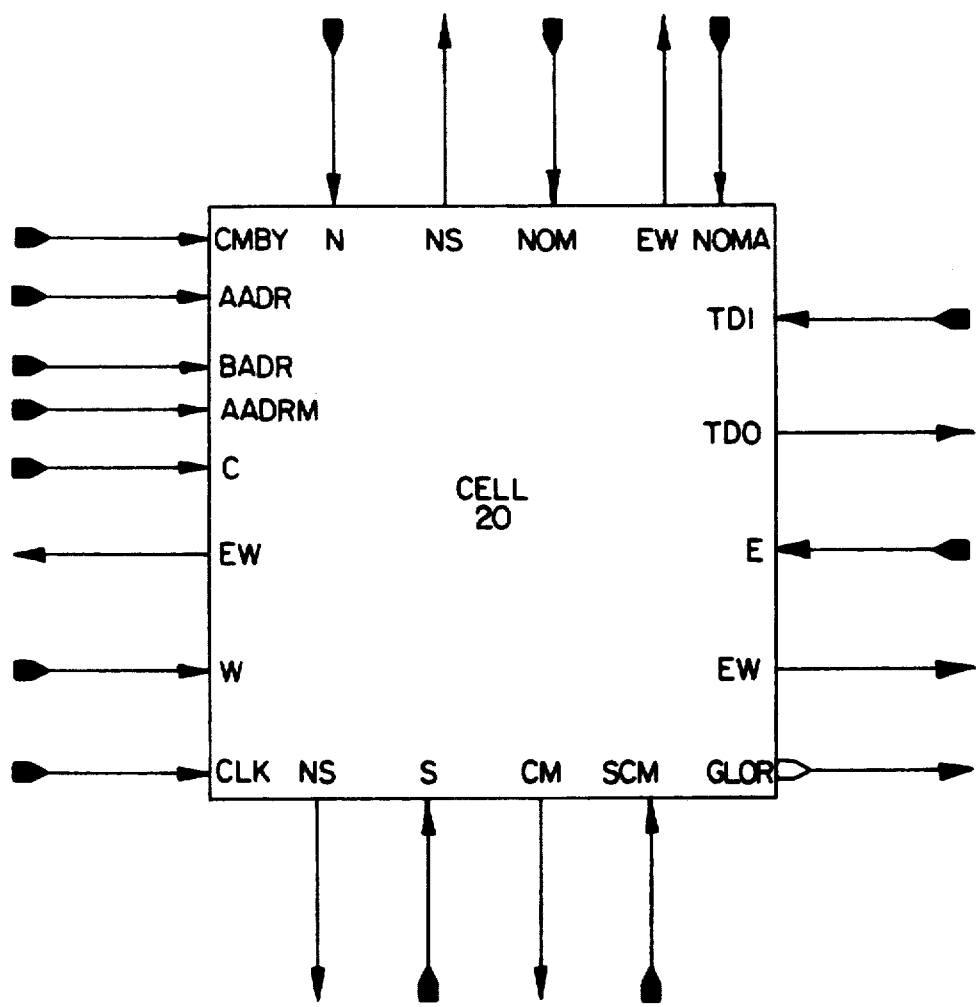
FIG. 9 is a key for showing I/O connections for a typical cell in the array of FIG. 8.

FIG. 8 shows a 4×4 array with cells having inputs as shown in FIG. 9. Each cell 20 has the capability of communicating with its nearest neighbors. There are bidirectional communication lines along the periphery of the array 10 to allow north to south, south to north, east to west, and west to east. Communication with another array or what may properly be regarded as another section of the same array if the 4×4 array depicted in FIG. 8 is regarded as being on one chip. Each cell 20 also preferably has the external I/O TD port 145 which allows communication with an external device. If an external device is used then each cell may be conceived of as having five nearest neighbors.

Figure 10:
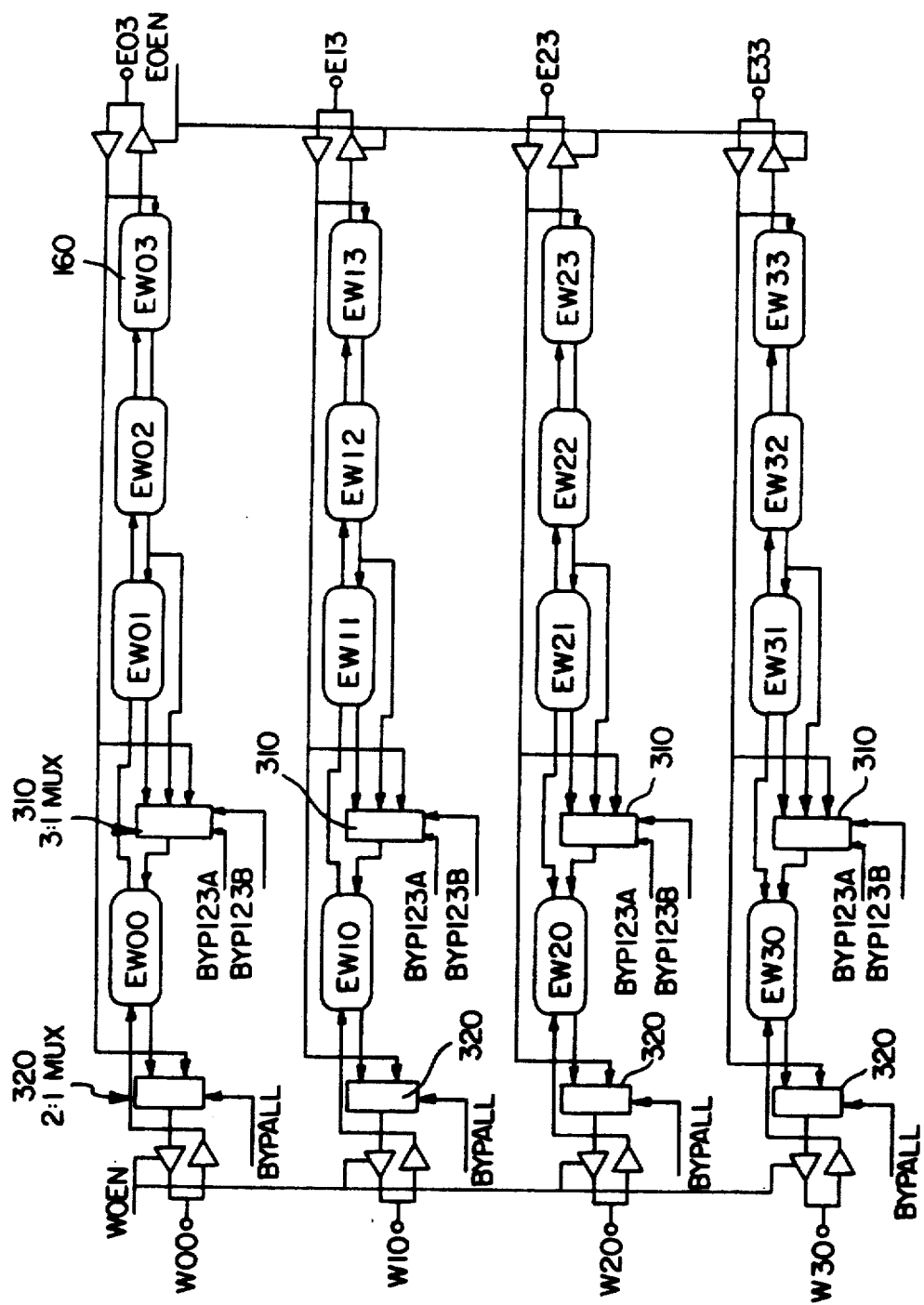
FIG. 10 is a schematic diagram of a bypass network included in an array according to a preferred embodiment of the present invention.

As alluded to above, there are certain applications in which it is desirable to have a cell communicate with another cell which is not its nearest neighbor. According to another aspect of the invention, the cell interconnection may be reconfigured for such applications. For this purpose, various multiplexers are provided to allow different communication links east to west and north to south. For example, FIG. 10 shows an east to west multiplexer bypass network for a 4×4 array of cells. For clarity, only the EW register 160 of each cell has been shown. The network includes 3:1 multiplexers 310 and a 2:1 multiplexers 320 for each row. The 3:1 multiplexer 310 in row 0, for example, has as its inputs the E port, the western output of cell 02, and the output of cell 01. Its output is supplied as the E register input of cell 00. The 2:1 multiplexer has as its input the western output of cell 00 and the E port. Thus, multiplexer 320 permits bypassing of the entire row. The arrangements for rows 1-, 2, and 3 are similar. The multiplexer 310 and 320 are controlled by appropriate control signals from the master controller 60. This network is associated with every row of cells and is preferably unidirectional. It will be noted that it is possible to bypass the row entirely.

Figure 11:
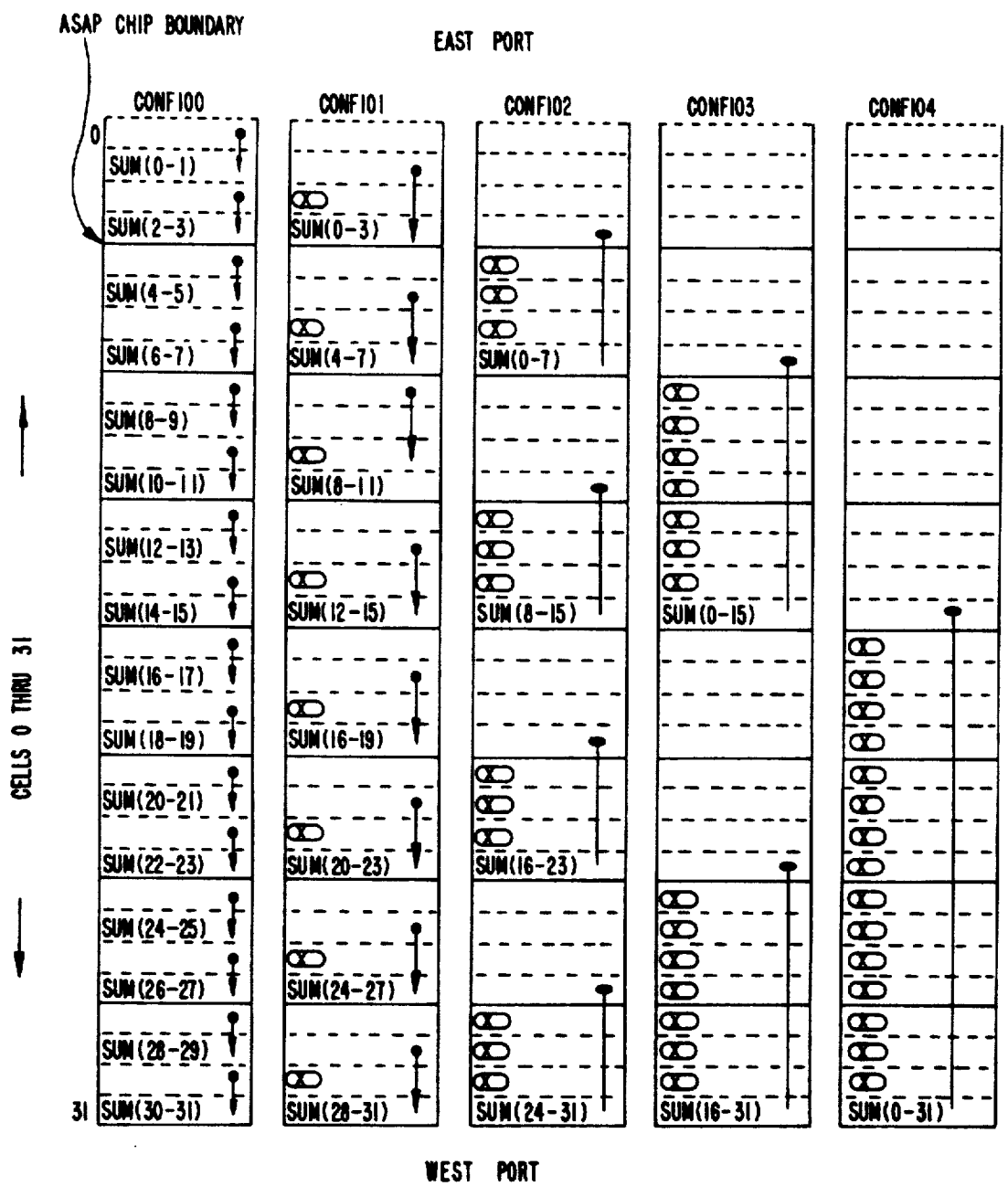
FIG. 11 is a diagram showing a particular application of the bypass network of FIG. 10.

One operation, for example, in which the bypass capability is particularly useful is in a row sum. The row sum is computed by having each cell shift its value to its western neighbor. Each cell then performs an addition of its previous contents with those just received. This will result in unique sums being formed in every even cell. The even cells are then interconnected by the network, bypassing the odd cells. The operation is continued until finally the westernmost cell contains the sum for the entire row. These operations are shown in FIG. 11.

Figure 12:
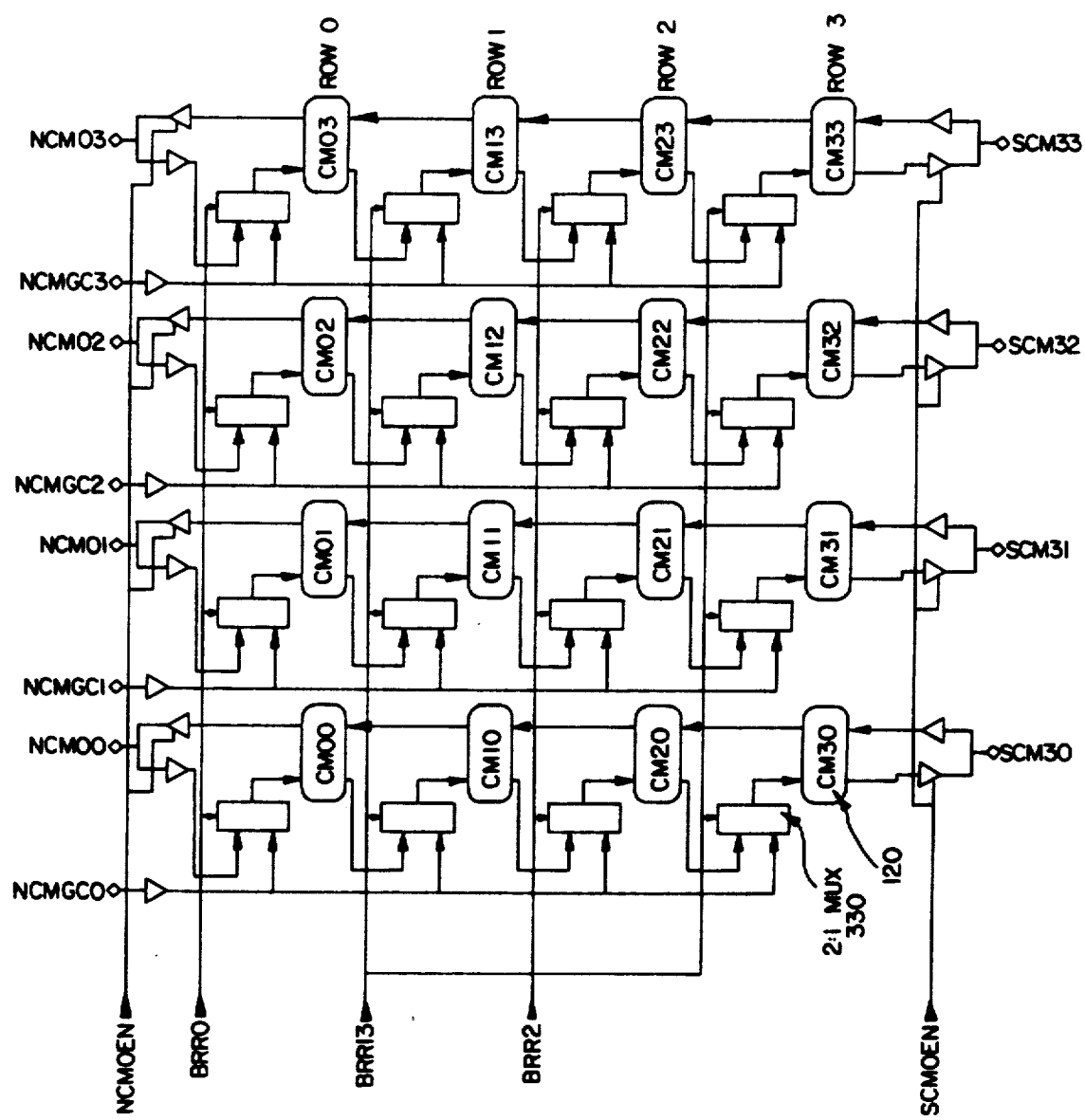
FIG. 12 is a schematic diagram of another bypass network included on an array according to a preferred embodiment of the present invention.

Other communication paths may be provided with associated bypass networks. For example, the CM communication path may have a bypass network as shown in FIG. 12. For clarity, a 4×4 array is shown, and each cell 20 is represented by its CM register 120. It will be understood, as before, however, that the array may be any size appropriate to an application, and that the CM register 120 is preferably interconnected to other components of the cell as described above. Intermeshed with the network formed of CM registers 120 is a network formed of a like number of 2:1 multiplexers 330. One input for each of the multiplexers 330 is the north global input for the column containing its associated cell. The other input for the northern edge cells is the column N input port. For the interior cells and the other edge cells, the other input is the CM register 120 of the nearest northern neighboring cell. Each multiplexer 330 presents its output to its associated CM register 120. Multiplexer 130 selects the active input according to appropriate control signals from the master controller 60.

The network of multiplexers 330 permits input data to be broadcast selectively in the NS direction. One bit of data may be distributed in one clock cycle to each cell of any number of columns. This significantly reduces the number of operations, and, hence, clock cycles for a number of functions. As an example, consider a matrix operation such as the multiplication of two matrixes A and B where B resides in the array. Rows of A may be broadcast across the array to effect the multiplication in fewer clock cycles than would be possible without this feature.

The present invention has been described above in terms of specific embodiments. It will be readily appreciated by one of ordinary skill in the art, however, that the invention is not limited to these embodiments, and that, in fact, the principals of the invention may be embodied and practiced in devices and methods other than those specifically described above. Therefore, the invention should not be regarded as being limited to these specific embodiments, but instead should be regarded as being fully commensurate in scope with the following claims.

What is claimed is:

1. A parallel data processor comprising:
   first means for generating control signals and address data; and
   a plurality of substantially identical processing cell means, for processing data one bit at a time, each of the cell means being connected to at least two other cell means, and each of the cell means including:
   (a) second means, internal to the cell means and responsive to said control signals, for generating effective address data based on said address data,
   (b) memory means, responsive to said first means and to said second means, for storing or retrieving one bit of data at addresses indicated by said effective address data and for storing said address data, and
   (c) third means, responsive to the memory means, for performing arithmetic operations on address data supplied by the memory means and for supplying results of said arithmetic operations to said second means, wherein said third means is for adding a first value indicative of an address and a second value indicative of an address offset.

2. A parallel data processor as claimed in claim 1, wherein said second means comprises a counter, and wherein said third means comprises a one-bit arithmetic logic unit.

3. A parallel data processor as claimed in claim 2, wherein a summing output of said arithmetic logic unit is connected to a serial input and output of said counter.

* * * * *